United States Patent Office 2,988,394
Patented June 13, 1961

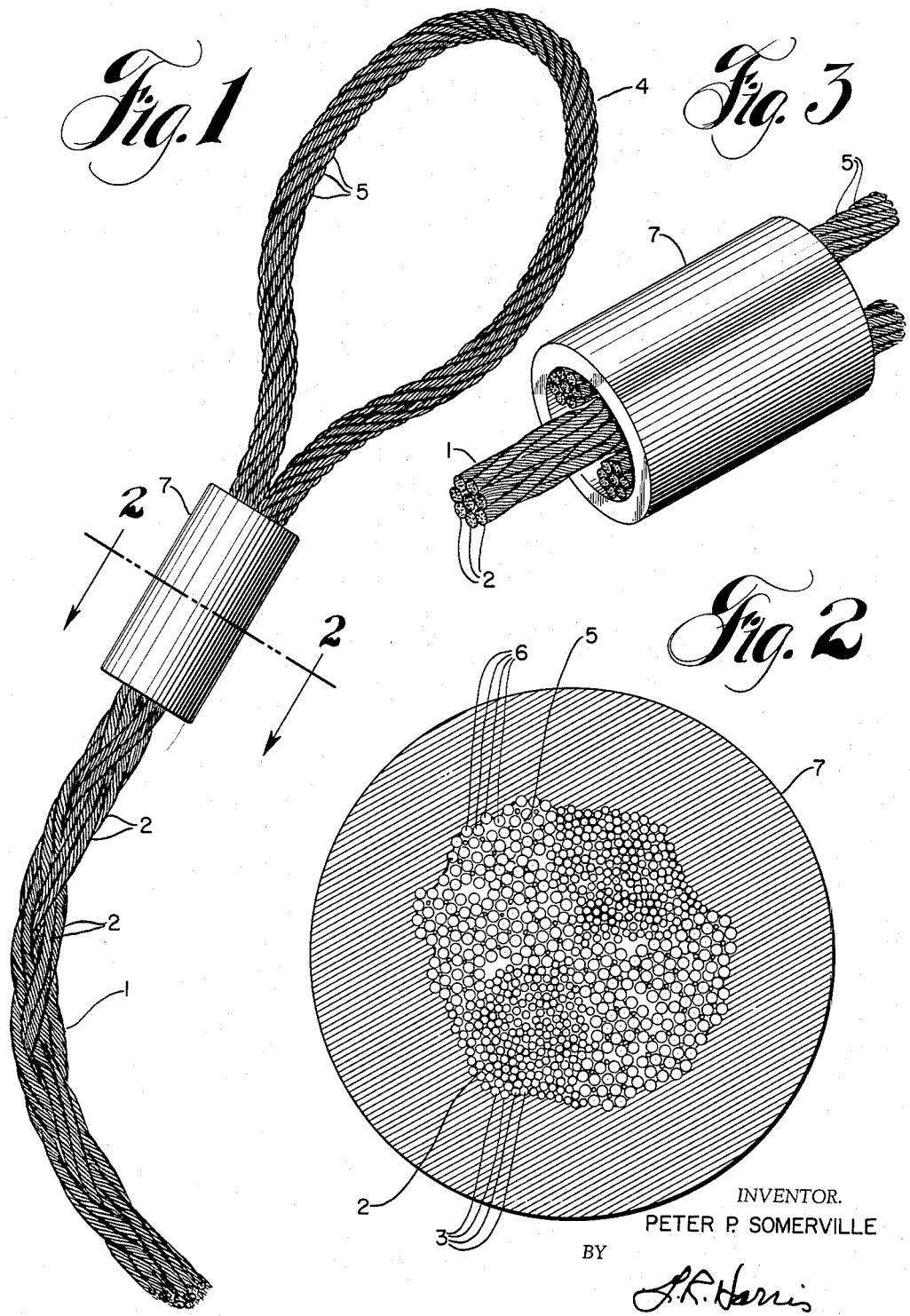

2,988,394
COMPOSITE WIRE ROPE SLING
Peter P. Somerville, Muncy, Pa., assignor to Jones & Laughlin Steel Corporation, Pittsburgh, Pa., a corporation of Pennsylvania
Filed Apr. 11, 1960, Ser. No. 22,656
4 Claims. (Cl. 294—74)

This invention relates to wire rope slings. It is more particularly concerned with a composite sling having a body portion of flexible wire rope and end portions of relatively stiffer wire rope joined to the body portion by compression fittings.

Wire rope slings are widely used for lifting heavy articles. A sling consists of a body portion which is conventionally formed of a flexible member, such as wire rope and a loop or eye at each end. In use one or more slings are passed around the article to be lifted and the eyes are slipped over a crane hook or hooks. The sling thus serves to support the load from the crane. It is desirable that the body portion of a sling be as flexible as possible in order that it may easily be passed around and under objects of various shapes and readily adapt itself to the contour of the object to be lifted. For this reason braided wire rope slings are desirable since they are considerably more flexible than conventional strand laid rope of the same cross sectional area.

A braided sling is normally constructed from one or two continuous lengths of rope. In an eight-part braided sling, made from one continuous rope, the component rope is first doubled back on itself until it is divided into three equal loops and two free ends which will eventually form the fourth loop when spliced together. Each of these loops must first have a predetermined number of twists put into it to counteract the twists imparted during the braiding operation. The three loops, and the pair of free ends, all containing back twist, are then hand braided together in much the same fashion as one would braid hair. The size of the loops or eyes remaining at each end depends on where the braiding operation starts and ends. The eye at one end is now composed of four parallel ropes that do not cross each other and are not fastened together, and the eye at the other end is of three parallel ropes plus the two free ends. The two free ends must now be hand spliced together to complete the fourth rope component around that end. In this condition the eyes are not usable because they are composed of four separate ropes. They, therefore, must be held together by seizing the loose ropes with small diameter wire or strand and soldering this together to prevent it from unraveling. The seizing also serves to prevent abrasion of the wires in the component ropes.

Seizing and soldering braided sling eyes usually requires more time and effort than all of the other assembly work combined in producing a braided sling and hence is a costly operation.

In a braided sling fabricated as above described, the probability of all loops being exactly the same length, so as to share the load equally, is remote. Because of this, it is necessary to make conventional braided slings of larger rope than would be required if the eyes or loops could be formed without impairing the load-carrying capacity of the rope.

It is an object of my invention, therefore, to provide a wire rope sling having a body portion which is relatively flexible and loop or eye portions which, though somewhat flexible, are damage-resistant. It is another object of my inveniton to provide a wire rope sling having a body portion of flexible wire rope and eye or loop portions formed from separate pieces of damage-resistant wire rope which are attached to the body of the sling by compression fittings. It is another object to provide a wire rope sling having body and eye portions made from separate pieces of wire rope united by a high-strength compression fitting. It is still another object of my invention to provide a braided sling the body portion of which can be made from any number of individual pieces of rope in lengths limited only by the amount of rope that can be held on reels. It is still another object of my invention to provide a balanced sling that does not depend on accuracy of measurement of the lengths of doubled back loops of a continuous component rope for developing the combined strength of all parts of rope involved or for determining the overall length of the finished sling. It is an important object of my invention to provide a wire rope sling as above described which can be fabricated rapidly and cheaply. Other objects of my invention will appear in the course of the following description thereof.

In an embodiment of my invention presently preferred by me, I provide a wire rope sling having a body portion of braided wire rope and eye portions each formed of a separate piece of conventional helically laid wire rope, each eye being attached to an end of the body portion by a compression fitting of malleable metal. This embodiment of my invention is illustrated in the attached figures, to which reference is now made.

FIG. 1 is a view of a portion of a sling of my invention showing the braided body portion of the sling attached to an end portion of helically laid rope by a compression fitting.

FIG. 2 is a cross section through the compression fitting taken on the plane 2—2 of FIG. 1.

FIG. 3 is a perspective view of the portion of my wire rope sling assembled within an uncompressed compression fitting prior to compression of the latter.

In the figures the body portion 1 of my wire rope sling is formed of a plurality of ropes 2—2 which are braided together to form the flexible braided wire rope. Eight such ropes are preferably braided together. Each rope 2 is composed of a number of individual strands 3 helically laid upon each other in a conventional manner. These strands, in turn, are composed of a number of small wires which are also helically laid upon each other. In the figures the individual wires making up each strand 3 are not separately shown. Each rope 2 typically comprises thirty-seven such strands 3. The eye or loop 4 of my sling is formed from conventional helically laid wire rope consisting of a plurality of strands 5 helically laid one upon another. Each strand 5 is formed of a plurality of individual wires 6 which are helically laid to form the strand. Typically my eye 4 comprises seven strands 5, each strand being made up of nineteen wires 6. It is seen from FIG. 1 that the lay of strands 5 of eye portion 4 of my sling is considerably shorter than the lay of the ropes 2 of body portion 1 of my sling. Loop end 4 is attached to sling body 1 by a more or less cylindrically compression fitting 7. Compression fitting 7 is a relatively thick-walled shell of malleable metal, which may be an aluminum alloy, and in its uncompressed condition has an oval or elliptical cross section, as may be observed from FIG. 3.

I form my sling by looping around the two ends of loop end 4 and inserting them in the same direction through uncompressed fitting 7. I then insert an end of my braided sling body 1 into uncompressed compression fitting 7, positioning it between the ends of loop or eye portion 4. The braided wire rope 1 extends away from compression fitting 7 at the opposite end from eye portion 4, as is shown in FIG. 3, and the end of rope 1 overlaps the ends of loop 4 with compression fitting 7. My compression fitting 7 is so dimensioned that the ropes 2 of my braided wire rope portion 1 must be spread out somewhat so that it can be inserted within compression fitting 7 between the ends of eye portion 4. Compression fitting 7 is then compressed between suitable dies into substantially cylindrical shape. The helically laid wire rope 4 is more resistant to distortion than braided rope portion 1 because the helically laid rope has a relatively smooth circular cross section. When compression fitting 7 is compressed, the wire strands within it are compressed into the configuration shown in FIG. 2. It will be observed from this figure that the various strands 5 forming each end of the wire rope eye portion 4 have been compressed into more or less triangular formation, the apexes of the triangles formed by each end facing each other. The strands 5 forming the helically laid wire rope 4 have separated the ropes 2 forming the braided wire rope portion into two substantially equal portions, and in so doing have greatly increased the area of contact between the ends of the helically laid wire rope portion 4 and braided wire rope portion 1. The metal of compression sleeve 7 presses the strands within it against each other firmly and also interpenetrates the outer wires of each strand to a considerable degree, thus forming a firm and strong bond between body portion and eye portion of my sling.

I prefer to employ for the end portions 4 of my sling helically laid wire rope having a substantially smaller diameter than that of braided sling body 1 because such a construction results in a better contact between body and eye portions of my sling within compression fitting 7. Furthermore, the relatively smooth helically laid wire rope requires no additional seizing.

It will be understood that the sling of my invention may be formed from wire rope types other than those mentioned above. I find, however, that the best bond between body or sling portion and eye portion occurs when the body portion is of substantially longer lay than the eye portion. Wire rope of longer lay is more flexible than wire rope of shorter lay and the more flexible rope portion is forced apart by the ends of the less flexible portion when the compression fitting is compressed, as shown in FIG. 2. The most flexible wire rope is made, as I have mentioned, by braiding together a number of smaller ropes, each of which is formed from a number of strands. Braided wire rope by its nature has a longer lay than helically laid rope. The eye portions of my sling may be made from any type of wire rope the strands of which are smoothly laid one against another with a relatively short lay so that each strand is supported and protected by the adjoining strands on either side of it.

I claim:

1. A composite wire rope sling comprising a flexible sling portion of wire ropes laid together, an eye portion formed of helically laid wire ropes having both ends disposed parallel to and overlapping an end of the sling portion, the ends of the eye portion being positioned on opposite sides of the end of the sling portion, and a sleeve compressed against the ends of the eye portion and the sling portion and forming therewith a connection transmitting the entire load from the sling portion to the eye portion, the lay of the sling portion being longer than the lay of the eye portion whereby the sleeve presses the rope of the eye portion into and substantially bisects the rope of the sling portion.

2. A composite wire rope sling as in claim 1 in which the helically laid wire rope is of smaller diameter than the flexible wire rope.

3. A composite wire rope sling as in claim 1 in which the sling portion is formed of braided wire ropes.

4. A composite wire rope sling as in claim 1 in which the strands of the helically laid wire rope are of smaller diameter than the ropes of the flexible sling portion.

References Cited in the file of this patent

UNITED STATES PATENTS

| | | |
|---|---|---|
| 1,686,288 | Meals | Oct. 2, 1928 |
| 1,886,086 | Damon | Nov. 1, 1932 |
| 1,909,344 | Green et al. | May 16, 1933 |
| 2,227,645 | Hayden | Jan. 7, 1941 |
| 2,304,306 | Hobbs | Dec. 8, 1942 |
| 2,641,810 | Gasink | June 16, 1953 |
| 2,727,720 | Barth | Dec. 20, 1955 |
| 2,771,315 | Fenwick | Nov. 20, 1956 |